United States Patent
Hrehoriak

(10) Patent No.: US 9,437,124 B1
(45) Date of Patent: Sep. 6, 2016

(54) FLYING DECORATION

(71) Applicant: John T. Hrehoriak, Glen Ellyn, IL (US)

(72) Inventor: John T. Hrehoriak, Glen Ellyn, IL (US)

(*) Notice: Subject to any disclaimer, the term of this patent is extended or adjusted under 35 U.S.C. 154(b) by 0 days.

(21) Appl. No.: 14/828,667

(22) Filed: Aug. 18, 2015

Related U.S. Application Data

(63) Continuation-in-part of application No. 14/529,191, filed on Oct. 31, 2014, now abandoned.

(51) Int. Cl.
| G09F 19/00 | (2006.01) |
| G09F 19/02 | (2006.01) |
| F16H 19/06 | (2006.01) |

(52) U.S. Cl.
CPC ............... *G09F 19/02* (2013.01); *F16H 19/06* (2013.01); *F16H 2019/0681* (2013.01)

(58) Field of Classification Search
CPC ...... A63H 21/02; A63H 18/14; A63H 19/24; A63H 27/04; A63H 18/023; A01M 29/06; E05F 15/632; E05Y 2201/652; E05Y 2201/668
USPC ................ 446/103, 433, 332, 454–456, 463, 446/465–467, 490; 40/617
See application file for complete search history.

(56) References Cited

U.S. PATENT DOCUMENTS

| | | | | |
|---|---|---|---|---|
| 1,674,293 A * | 6/1928 | Marx | ..................... | A63H 18/14 104/173.1 |
| 2,357,900 A * | 9/1944 | Lenhardt | ............... | A01M 29/06 446/228 |
| 2,941,332 A * | 6/1960 | Tracy | ..................... | A63H 18/14 446/451 |
| 3,405,478 A * | 10/1968 | Richter | ................. | A63H 21/02 446/229 |
| 3,600,843 A * | 8/1971 | Becker | ................... | A63H 27/04 273/108 |
| 3,693,290 A * | 9/1972 | Breslow | ................. | A63H 21/02 273/351 |
| 3,694,648 A * | 9/1972 | Yates | ..................... | A47G 33/08 359/799 |
| 3,864,868 A * | 2/1975 | Wolf | ..................... | A63H 27/12 446/229 |
| 3,922,970 A * | 12/1975 | Glastra | ................. | B61L 23/005 104/101 |

(Continued)

*Primary Examiner* — Shin Kim
(74) *Attorney, Agent, or Firm* — Donald J. Ersler

(57) ABSTRACT

A flying decoration includes a drive unit, at least one object mount, a transport line and an idler pulley device. The drive unit includes a drive motor, a system controller and a speed sensor. The drive unit is retained above the ground in one location and the idler pulley device is retained above the ground in another location. A drive pulley is mounted to a drive shaft of the drive motor. The system controller controls the rotation of the drive shaft. Both ends of the transport line are secured to the object mount to form a transport loop. The system controller includes an automatic travel distance calibration program. The object mount includes a line tensioning device for reducing slack in the transport loop. One end of the transport loop is retained on the drive pulley and the other end is retained on an idler pulley of the idler pulley device.

20 Claims, 14 Drawing Sheets

(56) References Cited

U.S. PATENT DOCUMENTS

| | | | | |
|---|---|---|---|---|
| 4,177,991 A * | 12/1979 | Meyer | A63H 27/10 | 273/317 |
| 4,244,136 A * | 1/1981 | Kublan | A63H 11/04 | 248/331 |
| 4,266,369 A * | 5/1981 | Spector | A63H 21/02 | 446/229 |
| 4,673,848 A * | 6/1987 | Hagiwara | E05F 15/632 | 318/254.1 |
| 4,817,937 A * | 4/1989 | Ozeki | G09B 23/10 | 446/30 |
| 4,994,724 A * | 2/1991 | Hsu | G05B 19/232 | 318/282 |
| 5,956,880 A * | 9/1999 | Sugimoto | A01M 29/06 | 116/22 A |
| 5,989,098 A * | 11/1999 | Reynolds | G09F 27/00 | 40/455 |
| 6,109,186 A * | 8/2000 | Smith | A63H 18/12 | 104/295 |
| 6,110,004 A * | 8/2000 | McKinley | A63H 21/02 | 434/302 |
| 6,311,425 B1 * | 11/2001 | Capps | A01M 31/06 | 43/3 |
| 6,796,871 B1 * | 9/2004 | Hsieh | A63H 21/02 | 446/228 |
| 6,908,066 B2 * | 6/2005 | Koenig | A63H 18/16 | 246/122 A |
| 7,264,207 B2 * | 9/2007 | Young | A63H 19/24 | 246/1 R |
| 7,654,217 B2 * | 2/2010 | Sullivan | A01M 29/06 | 116/22 A |
| 2002/0095833 A1 | 7/2002 | Rutkoske | | |
| 2003/0155470 A1 * | 8/2003 | Young | A63H 19/24 | 246/122 A |
| 2006/0073760 A1 * | 4/2006 | Tremel | A63H 18/023 | 446/454 |
| 2009/0111356 A1 * | 4/2009 | Haass | A63H 18/023 | 446/444 |
| 2010/0099506 A1 | 4/2010 | Tenbrunsel | | |

* cited by examiner

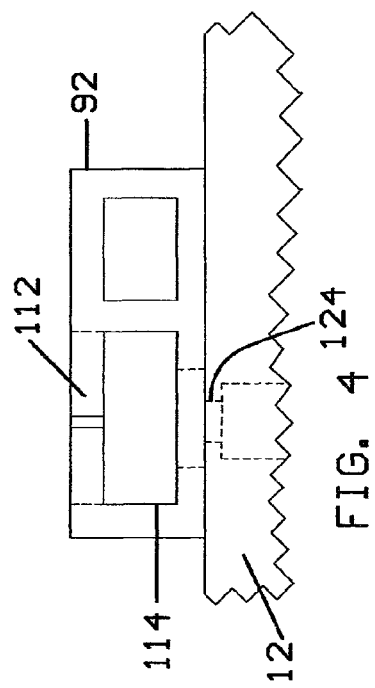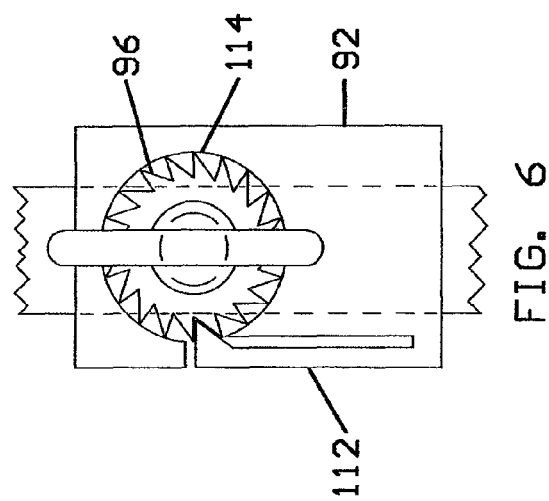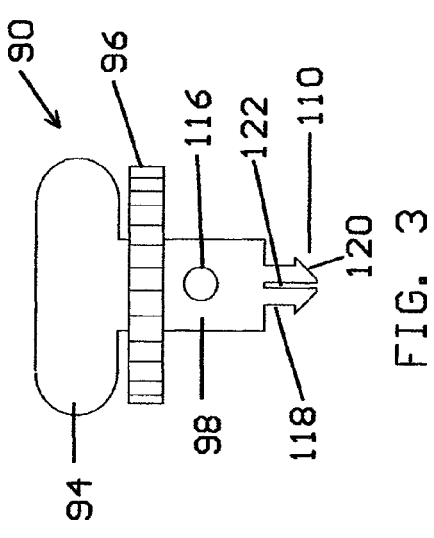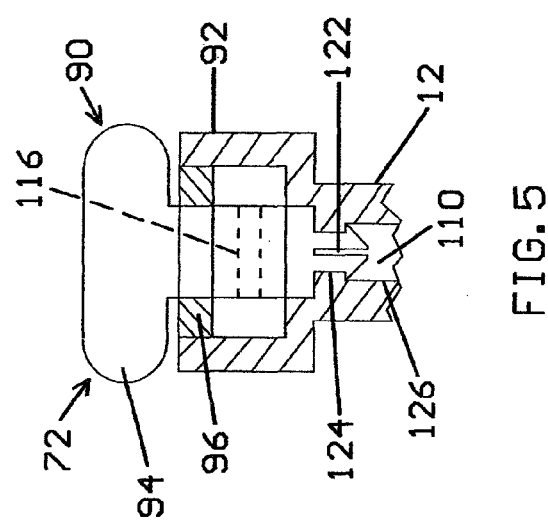

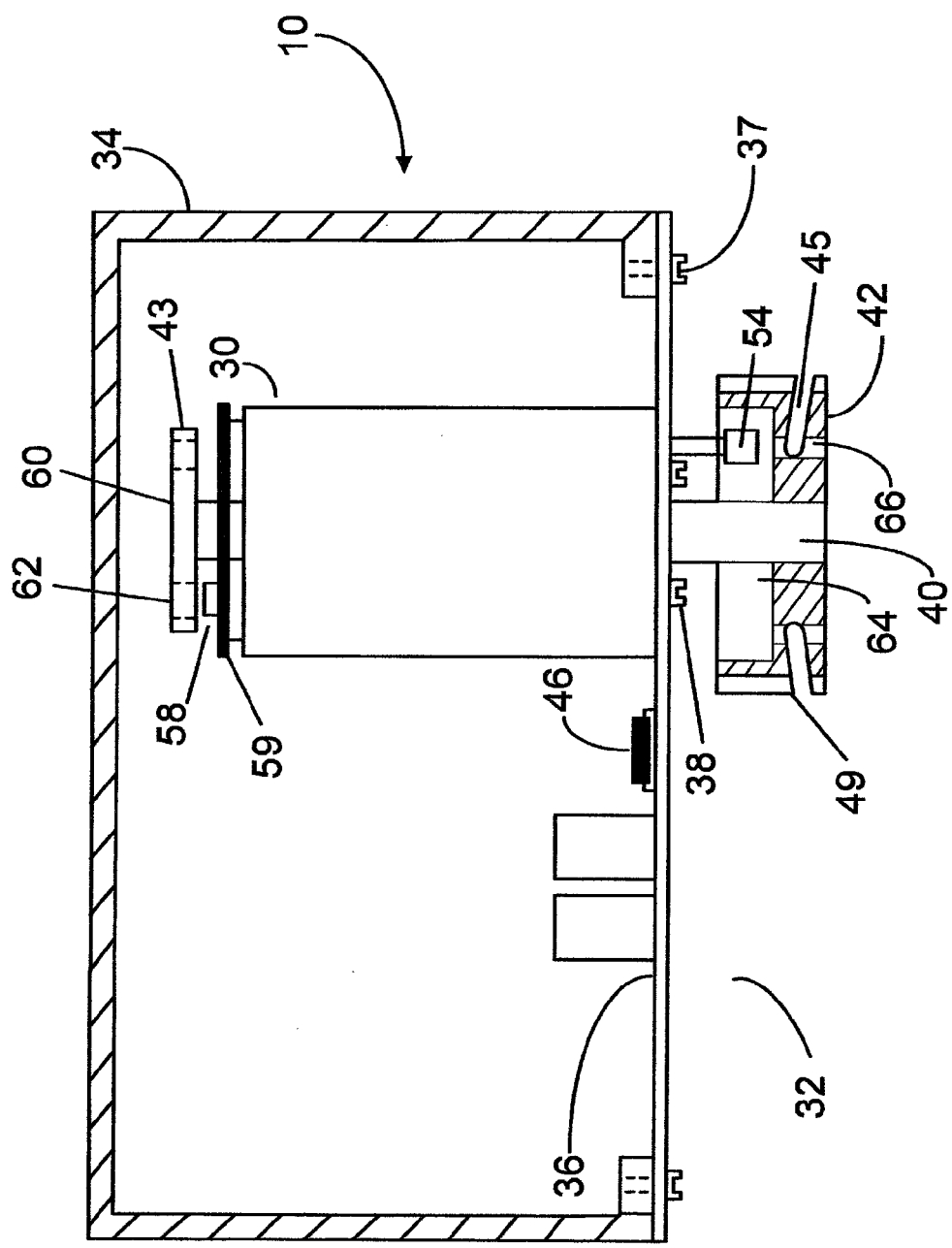

FLYING DECORATION

CROSS-REFERENCES TO RELATED APPLICATIONS

This is a continuation-in-part patent application taking priority from patent application Ser. No. 14/529,191 filed on Oct. 31, 2014.

BACKGROUND OF THE INVENTION

1. Field of the Invention

The present invention relates generally to holiday displays and more specifically to a flying decoration, which includes a system controller having automatic travel distance calibration.

2. Discussion of the Prior Art

Patent application no. 2002/0095833 to Rutkoske discloses a flying ghosts movable ornamental display. Patent application no. 2010/0099506 to Tenbrunsel discloses an apparatus for circulating novelty figures.

Accordingly, there is a clearly felt need in the art for a flying display, which includes a system controller having automatic travel distance calibration, a line tensioning device and at least one object mount for shuttling an object back and forth in a substantially linear motion.

SUMMARY OF THE INVENTION

The present invention provides a flying decoration, which includes at least one moving object shuttled in a substantially linear motion. The flying decoration preferably includes a drive unit, an one object mount, a transport line and an idler pulley device. The drive unit preferably includes a drive motor, a system controller and a speed sensor. The drive unit is retained above the ground in one location and the idler pulley device is retained above the ground in another location. A drive pulley is mounted to a drive shaft of the drive motor. The drive pulley is located outside the drive unit. The system controller controls the rotation of the drive shaft. Both ends of the transport line are secured to the object mount to form a transport loop. One end of the transport loop is retained on the drive pulley and the other end is retained on the idler pulley. The system controller includes an automatic travel distance calibration program. The automatic travel distance calibration program is activated, after the system controller is supplied with electrical power.

The object mount preferably includes an object hanger, a first line support, a second line support, a line mount and a line tensioning device. The first line support is formed on a first end of the object mount and the second line support is formed on a second end of the object mount. The first calibration claw is formed on a concave outside surface of the first line support and the second calibration claw is formed on a concave outside surface of the second line support. The line mount and the line tensioning device are disposed between the first and second line supports. The object mount is structured to retain shuttle signs, banners, decorations and any other suitable object. An object mount extension is used when the object is longer than the object mount. The object mount extension is attached along the transport line to support an opposing end of an object attached to the object mount.

The automatic travel distance calibration program (calibration program) preferably works in the following manner. The calibration program instructs the drive motor to rotate in one direction, which causes one of the calibration claws to jam the rotation of either drive pulley or driven pulley, which stops the drive motor from rotating. The calibration program detects that the drive motor is no longer rotating. The calibration program instructs the motor to rotate in a reverse direction. The drive pulley includes a plurality of holes axial holes. A speed sensor determines the number of rotations of the drive pulley by counting the number of plurality of holes of the drive pulley, until the opposing calibration claw jams the opposing pulley and stops the rotation of the drive motor. The speed sensor provides the number of holes counted to the calibration program, which calculates the distance traveled. The system controller will now know when to reverse rotation of the drive motor.

Accordingly, it is an object of the present invention to provide a flying decoration, which includes a system controller having a calibration program.

It is a further object of the present invention to provide a flying decoration, which includes a line tensioning device.

Finally, it is another object of the present invention to provide a flying decoration, which includes an object mount for shuttling an object back and forth in a substantial linear motion.

These and additional objects, advantages, features and benefits of the present invention will become apparent from the following specification.

BRIEF DESCRIPTION OF THE DRAWINGS

FIG. 3 is a side view of a gear drive of a line tensioning device of a flying decoration in accordance with the present invention.

FIG. 4 is a side view of a ratchet housing of a line tensioning device extending from a top of an object mount of a flying decoration in accordance with the present invention.

FIG. 5 is a cross sectional end view of a gear drive retained in a ratchet housing of a line tensioning device of a flying decoration in accordance with the present invention.

FIG. 6 is a top view of a gear drive retained in a ratchet housing of a line tensioning device of a flying decoration in accordance with the present invention.

FIG. 11 is a top cross sectional view of a drive unit of a flying decoration in accordance with the present invention.

DETAILED DESCRIPTION OF THE PREFERRED EMBODIMENTS

Figure 1:
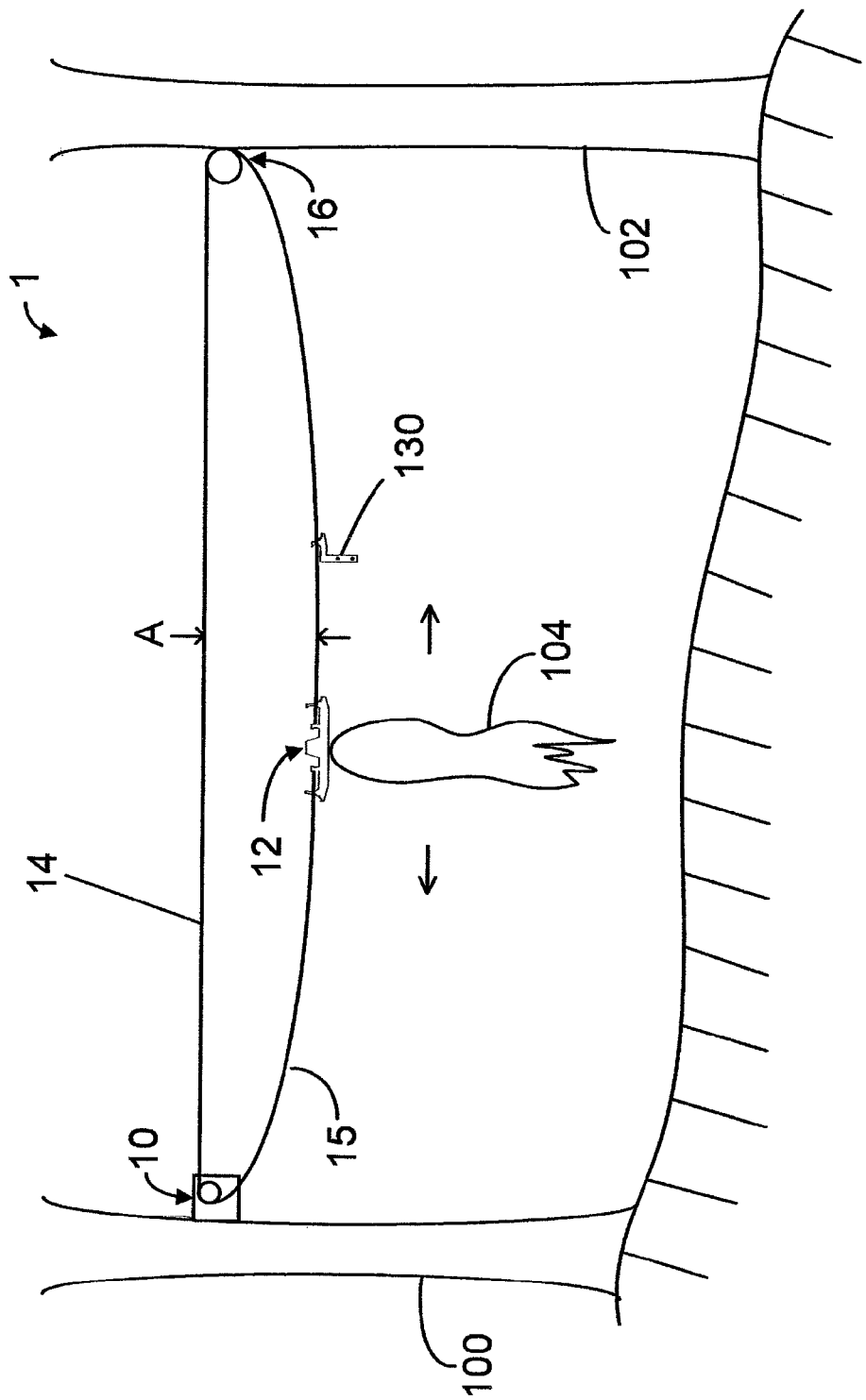
FIG. 1 is a front view of a flying decoration with an object suspended there from in accordance with the present invention.
Figure 2:
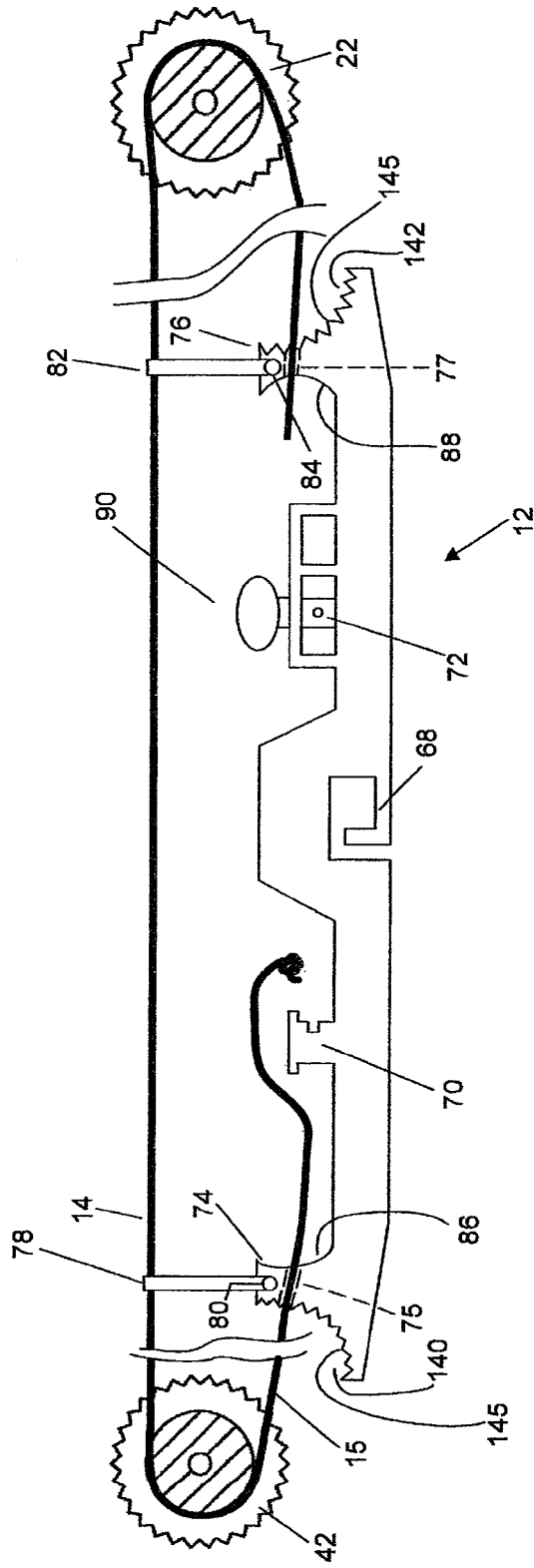
FIG. 2 is a front view of an object mount of a flying decoration in accordance with the present invention.
Figure 8:
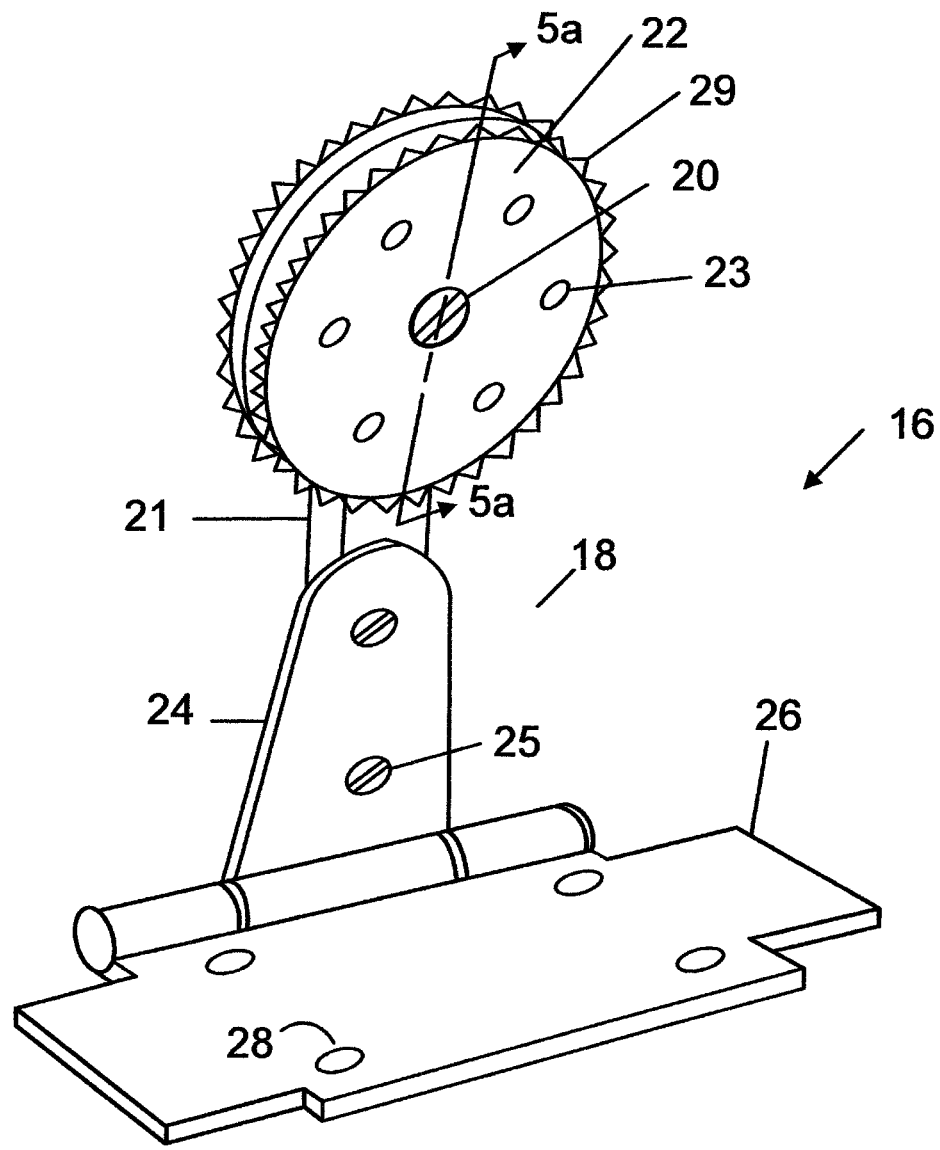
FIG. 8 is a perspective view of an idler pulley device of a flying decoration in accordance with the present invention.

With reference now to the drawings, and particularly to FIG. 1, there is shown a front view of a flying decoration 1 supported between a first tree 100 and a second tree 102. With reference to FIG. 2, the flying decoration 1 preferably includes a drive unit 10, an object mount 12, a transport line 14 and an idler pulley device 16. With reference to FIG. 8, the idler pulley device 16 includes a hinged bracket 18, a pulley shaft 20, an alignment bar 21 and an idler pulley 22. The hinged bracket 18 includes a pulley plate 24 and a mounting plate 26. The pulley plate 24 is hinged to the mounting plate 26. However, other designs of brackets may also be used. A plurality of mounting holes 28 are formed through the mounting plate 26 for the attachment of the mounting plate 26 to a mounting surface with fasteners, such as a tree. The alignment bar 21 is secured to the pulley plate 24 with fasteners 25 or the like. The idler pulley 22 is rotatably retained on the alignment bar 21 with the pulley shaft 20.

Figure 8A:
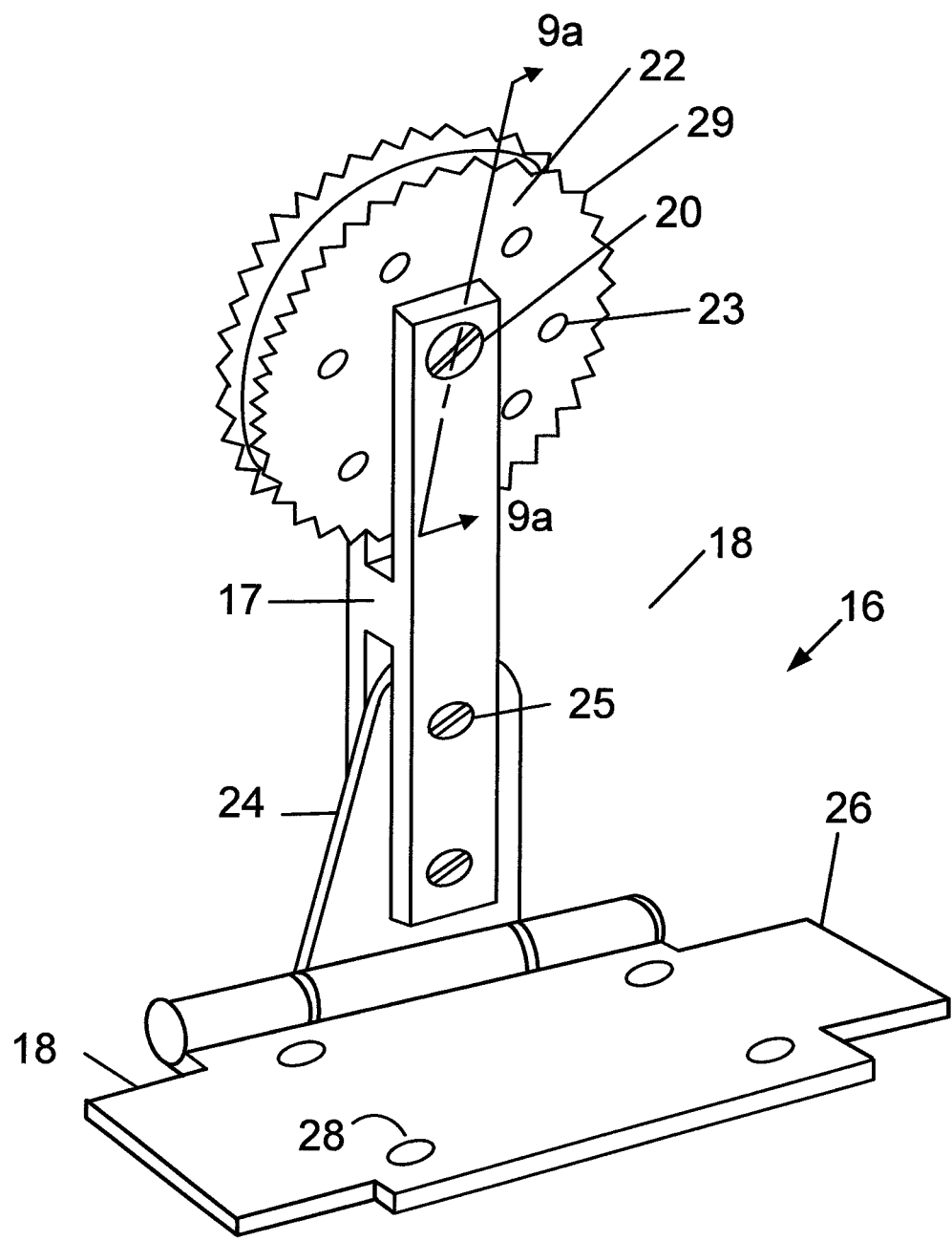
FIG. 8a is a perspective view of an idler pulley device supported by two alignment bars of a flying decoration in accordance with the present invention.

With reference to FIG. 8a, the idler pulley 22 is pivotally supported by an idler pulley arm 17 and the pulley shaft 20. A flange bearing 19 is preferably inserted into the idler pulley 22. The idler pulley arm 17 is secured to the pulley plate 24 with fasteners 25 or the like. The idler pulley 22 is rotatably retained on the idler pulley arm with the pulley shaft 20. The pulley shaft 20 is preferably a threaded fastener.

Figure 9:
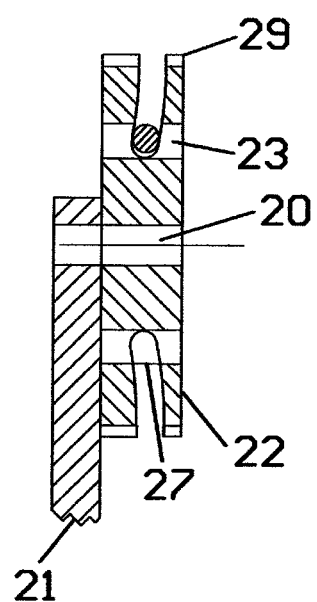
FIG. 9 is a cross sectional view of FIG. 8 of a flying decoration in accordance with the present invention.
Figure 9A:
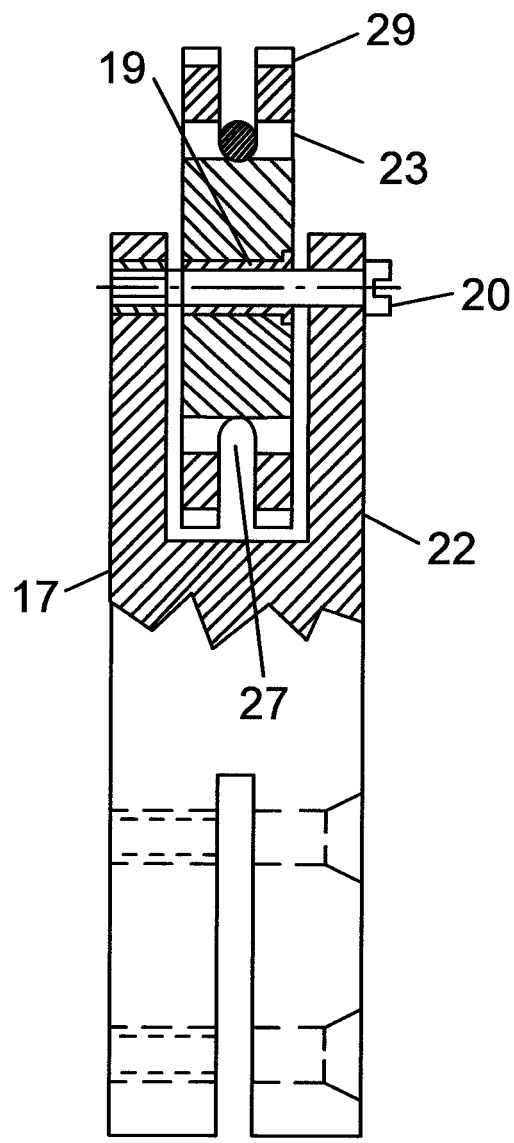
FIG. 9a is a cross sectional view of FIG. 8a of a flying decoration in accordance with the present invention.

With reference to FIGS. 9-9a, plurality of drainage holes 23 are formed through the idler pulley 22 to assist in removing water, moisture, dirt, snow and the like from an inwardly angled or an inwardly curving groove 27 of the idler pulley 22. A portion of the inwardly angled or an inwardly curving groove 27 is hidden from view. It is preferable to form a plurality of teeth 29 on outside perimeter of the idler pulley 22.

Figure 10:
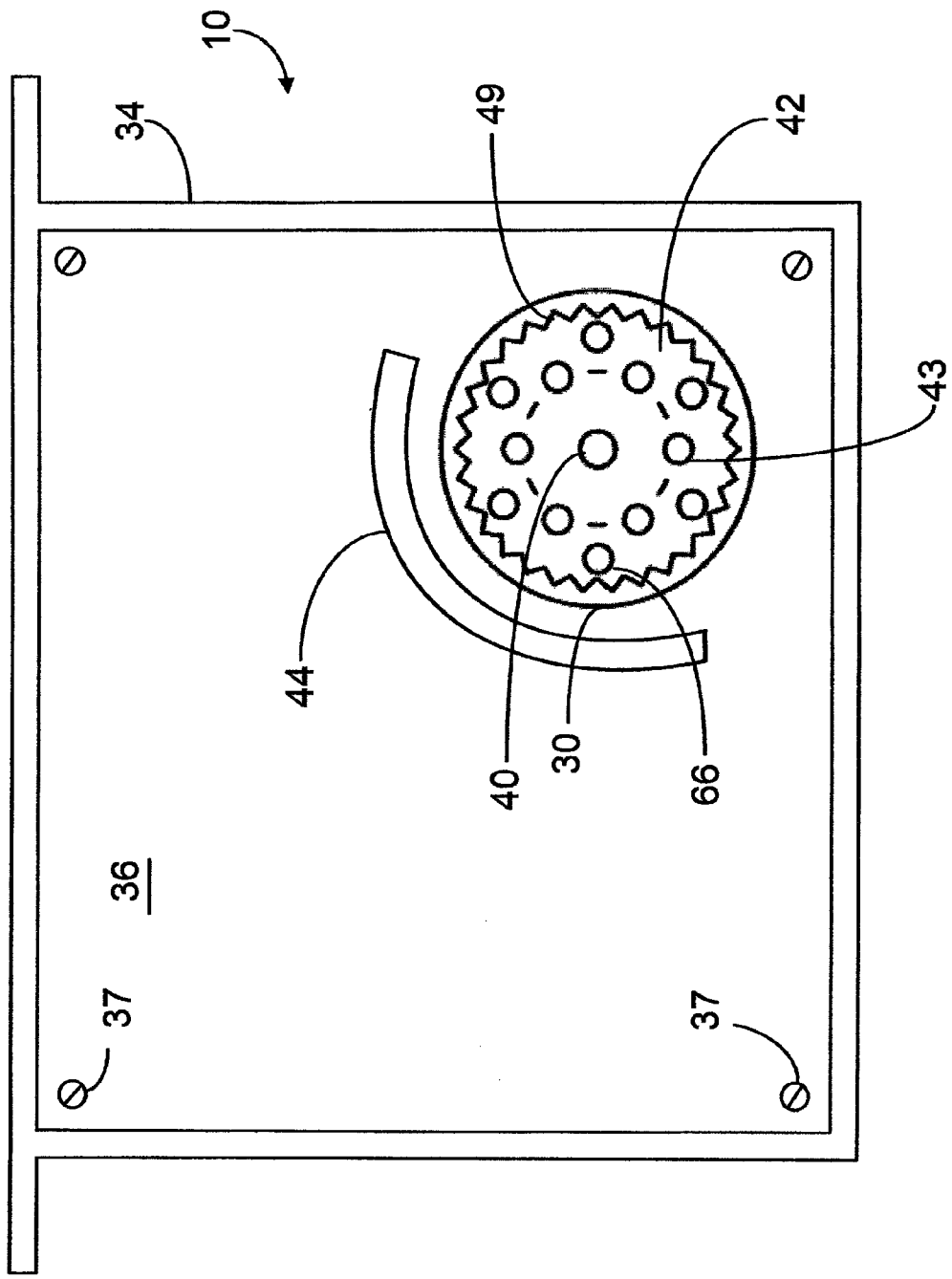
FIG. 10 is a front cross sectional view of a drive unit of a flying decoration in accordance with the present invention.

With reference to FIGS. 10-11, the drive unit 10 preferably includes a drive motor 30, a system controller 32 and a housing 34. The drive unit 10 is mounted above the ground in one location and the idler pulley device 16 is mounted above the ground in another location. The system controller 32 includes a circuit board 36. The circuit board 36 is preferably mounted to the housing 34 with a plurality of fasteners 37. The drive motor 30 is preferably mounted to an inside surface of the circuit board 36 with a plurality of fasteners 38. The drive motor 30 preferably includes a double-ended drive shaft 40. A drive pulley 42 is mounted to one end of the drive shaft 40. The one end of the drive shaft 40 extends through the circuit board 36, such that the drive pulley 42 is located outside the drive unit 10. A pulley shroud 44 is attached to the circuit board 36 to cover a top of the drive pulley 42. A plurality of drainage holes 43 are formed through the drive pulley 42 to assist in removing water, moisture, dirt, snow and the like from an inwardly curing groove 45 of the drive pulley 42. A portion of the inwardly angled or an inwardly curving groove 45 is hidden from view. It is preferable to form a plurality of teeth 49 on outside perimeter of the drive pulley 42.

Figure 10A:
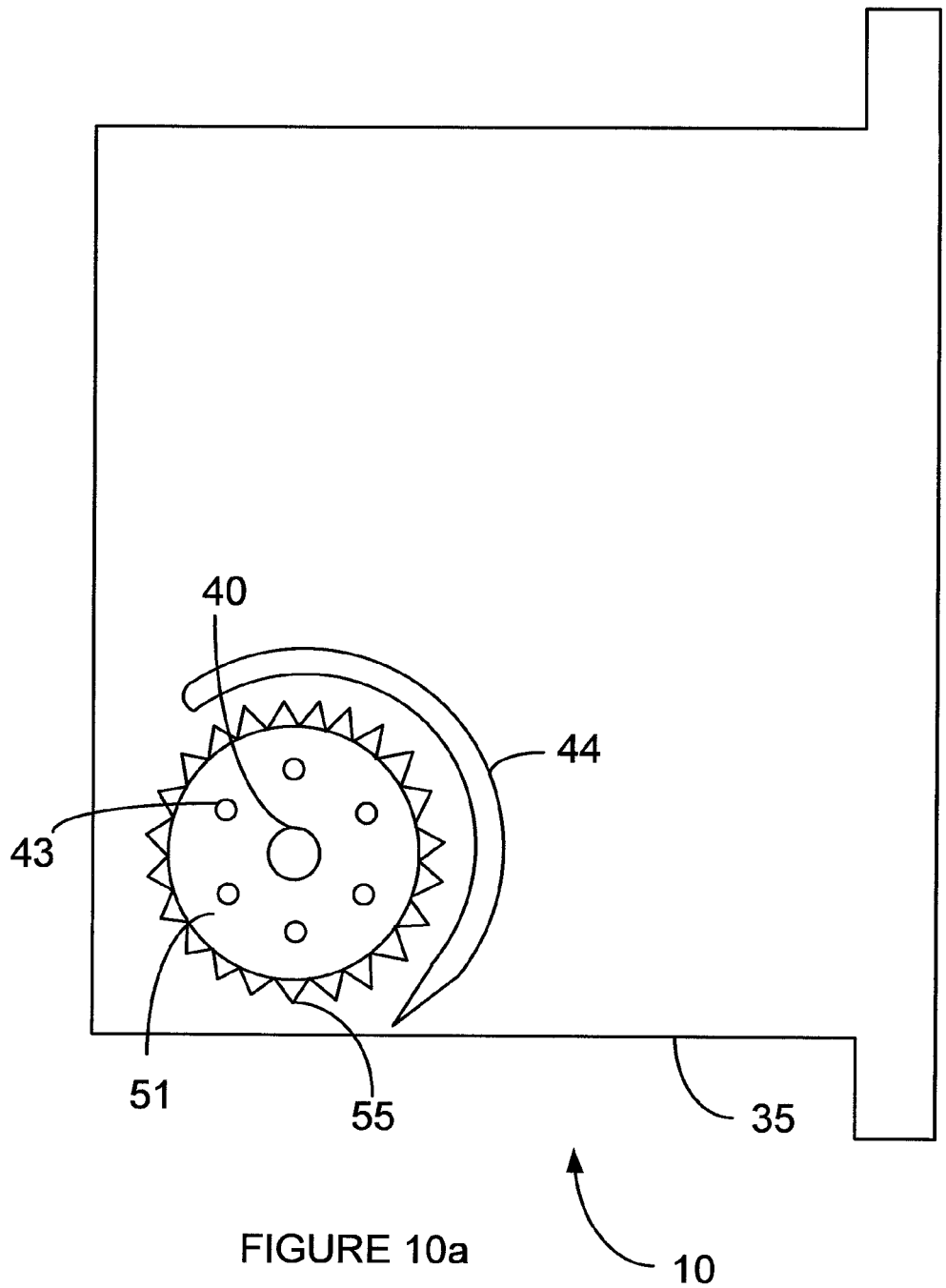
FIG. 10a is a front view of an alternative embodiment of a housing with a drive unit extending there from of a flying decoration in accordance with the present invention.
Figure 11A:
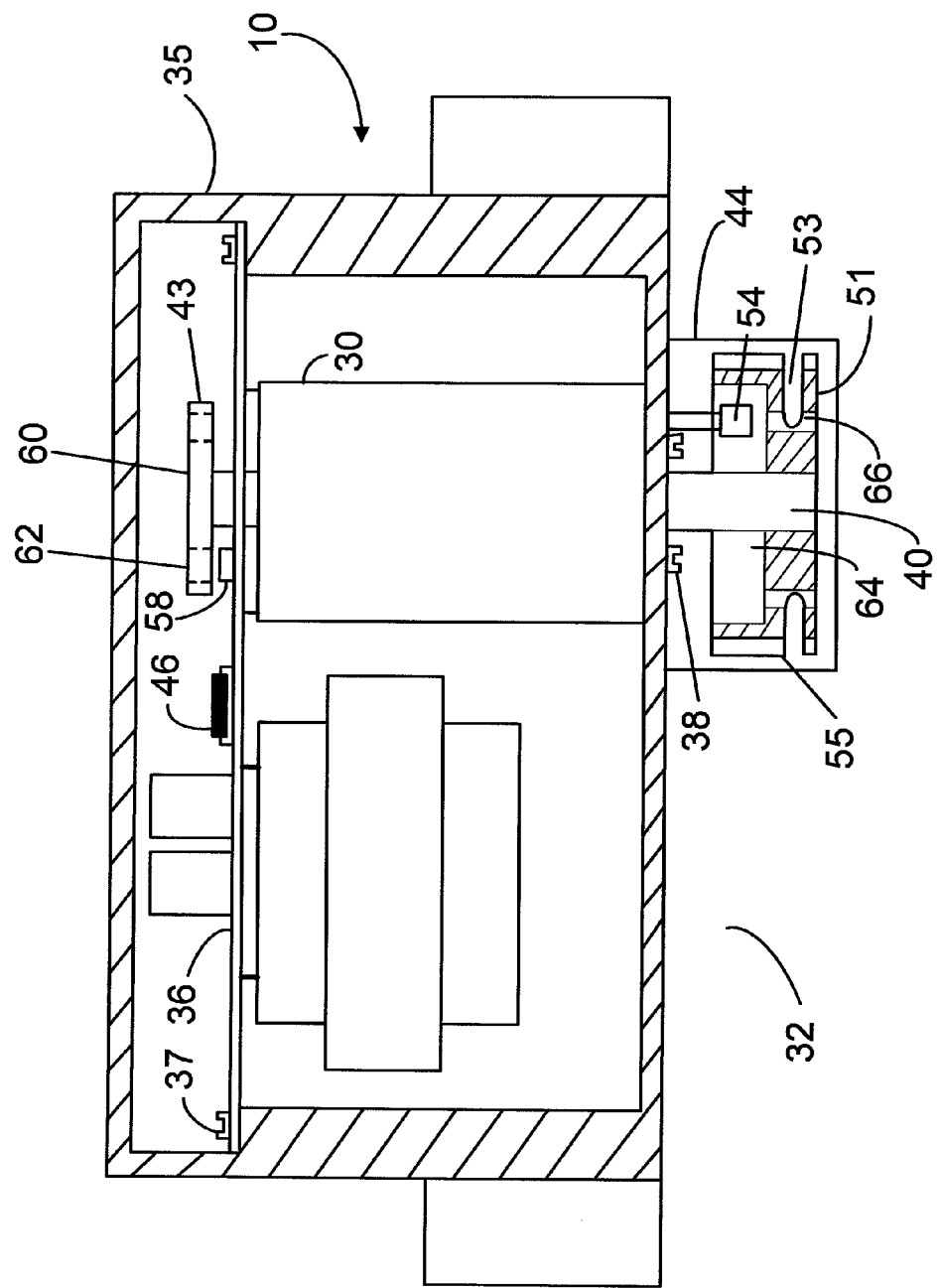
FIG. 11a is a top cross sectional view of an alternative embodiment of a housing with a drive unit extending there from of a flying decoration in accordance with the present invention.

With reference to FIGS. 10a and 11a, the drive unit 10 preferably includes a drive motor 30, a system controller 32 and a housing 35. The drive unit 10 is mounted above the ground in one location and the idler pulley device 16 is mounted above the ground in another location. The system controller 32 includes a circuit board 36. The circuit board 36 is preferably mounted to the housing 35 with a plurality of fasteners 37. The drive motor 30 is preferably mounted to an inside surface of the housing 35 with a plurality of fasteners 38. The drive motor 30 preferably includes a double-ended drive shaft 40. A drive pulley 51 is mounted to one end of the drive shaft 40. The one end of the drive shaft 40 extends through the circuit board 36, such that the drive pulley 51 is located outside the drive unit 10. A pulley shroud 44 extends from an outer surface of the housing 35, adjacent the drive pulley 51. A plurality of drainage holes 66 are formed through a drive pulley 51 to assist in removing water, moisture, dirt, snow and the like from a groove 53 of the drive pulley 51. It is preferable to form a plurality of teeth 55 on outside perimeter of the drive pulley 51.

Figure 12:
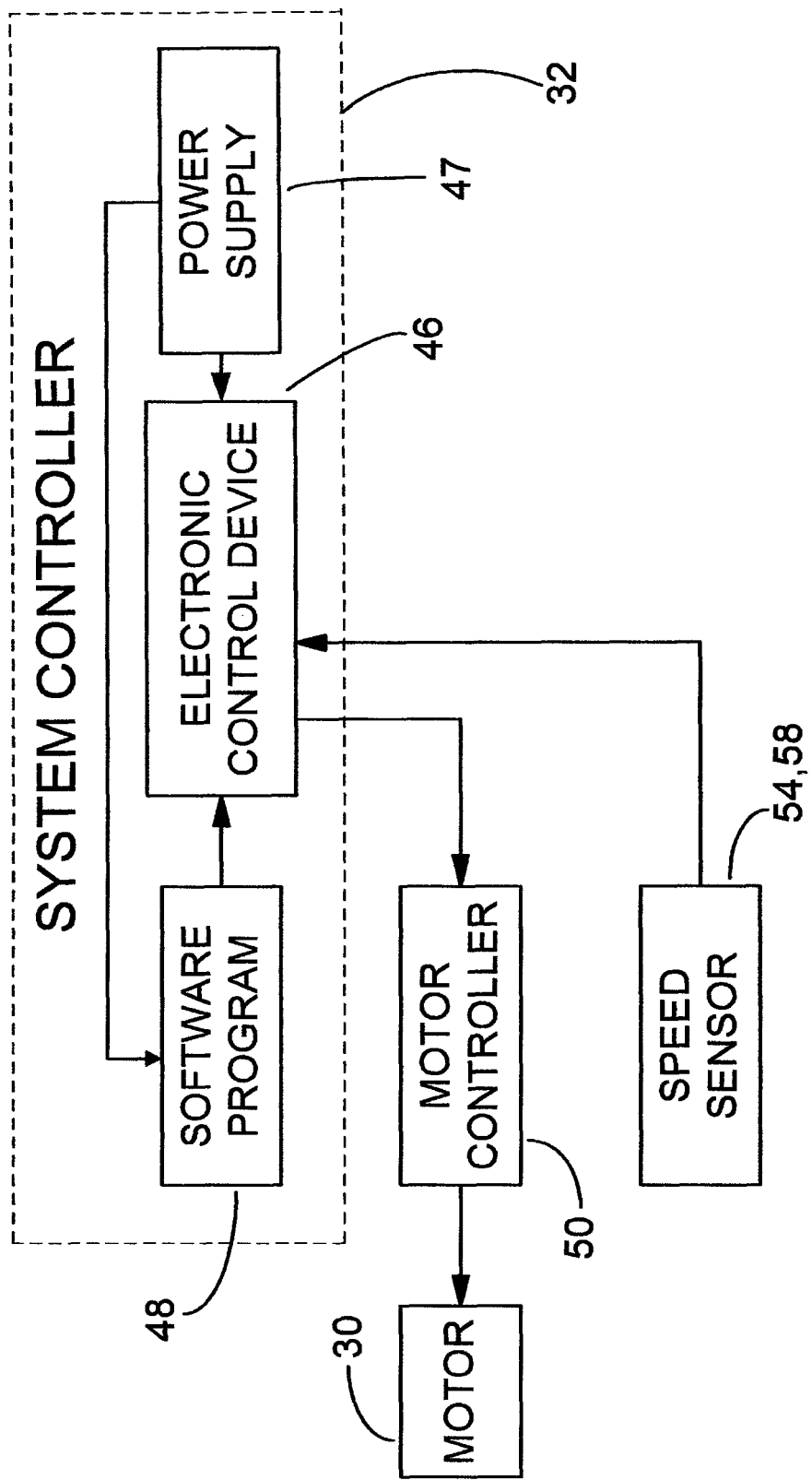
FIG. 12 is a schematic diagram of electrical and electronic components of a flying decoration in accordance with the present invention.

With reference to FIG. 12, the system controller 32 includes an electronic control device 46, such as a microcontroller or microprocessor. The electronic control device 46 includes a calibration software program 48. The system controller 32 is connected to a motor controller 50 and a pulley speed sensor 54, 58. The motor controller 50 controls the speed and direction of the motor shaft 40. The system controller 32 sends instructions to the motor controller 50. If the pulley speed sensor 58 is used, a reflective disc 60 is attached to the other end of the drive shaft 40. A plurality of holes 62 are formed through the reflective disc 60 for sensing by the pulley speed sensor 58. The pulley speed sensor 58 is preferably mounted to a snubber circuit board of the drive motor 30. The speed sensor 58 detects the rotational speed of the drive pulley 42 through the rotation of the plurality of holes 62. The electronic control device 46 counts the number pluses generated by the plurality of holes spinning by the speed sensor 58 to determine the travel distance from the drive unit 10 to the idler pulley 16, during automatic calibration. If the pulley speed sensor 54 is used, a sensor cavity 64 is formed in a rear of the drive pulley 42. The drive pulley speed sensor 54 is mounted to an outside surface of the circuit board 36. The pulley speed sensor 54 measures the number of pulses generated by a plurality of holes 66 in the drive pulley 42. It is preferable to use the pulley speed sensor 58 located inside the housing 34.

With reference to FIG. 2, each object mount 12 preferably includes an object hanger 68, a line mount 70, a line tensioning device 72, a first line support 74 and a second line support 76. With reference to FIG. 1, an object 104 is secured to the object hanger 68 with any suitable method. Preferably, a first optional tie wrap 78 or the like is inserted through a first hole 80 in the first line support 74 and secured to itself around the transport line 14. Preferably, a second optional tie wrap 82 or the like is inserted through a second hole 84 in the second line support 76 and secured to itself around the transport line 14. One end of the transport line 14 is inserted through a first hole 75 in the first line support 74 and the other end of the transport line 14 is inserted through a second hole 77 in the second line support 76. One end of the transport line 14 is tied or secured to the line mount 70 and the other end of the transport line 14 is retained by the line tensioning device 72 to form a transport loop 15. One end of the transport loop 15 is supported on the drive pulley 42 and the other end of the transport loop 15 is supported on the idler pulley 22.

A first curved surface 86 is formed on an inside surface of the first line support 74 and a second curved surface 88 is formed on an inside surface of the second line support 76. The first and second curved surfaces 86, 88 assist in holding the object mount 12 while increasing the tension on the transport line 14. With reference to FIGS. 3-6, the line tensioning device 72 is formed on a top of the object mount 12, adjacent the second line support 76. The line tensioning device 72 preferably includes a gear drive 90 and a ratchet housing 92. The gear drive 90 includes a twist handle 94, a gear 96, a shaft 98 and a snap retainer 110. The twist handle 94 extends from one end of the shaft 98. The gear 96 is disposed adjacent a bottom of the twist handle 94. The other end of the shaft 98 is terminated with the snap retainer 110.

The ratchet housing 92 includes an integral pawl 112. The integral pawl 112 is formed as an integral portion of the ratchet housing 92. A line access opening 114 is formed through ratchet housing 92 to provide clearance for inserting an end of the transport line 14 through a line hole 116 in the shaft 98. The snap retainer 110 includes a retainer shaft 118 and a snap lip 120. A relief slit 122 is formed axially in the snap retainer 110. A retainer hole 124 is formed through the object support 12 to rotatably receive the retainer shaft 118. A snap counterbore 126 is formed in a bottom of the object support 12 to provide clearance for the snap lip 120.

Figure 7:
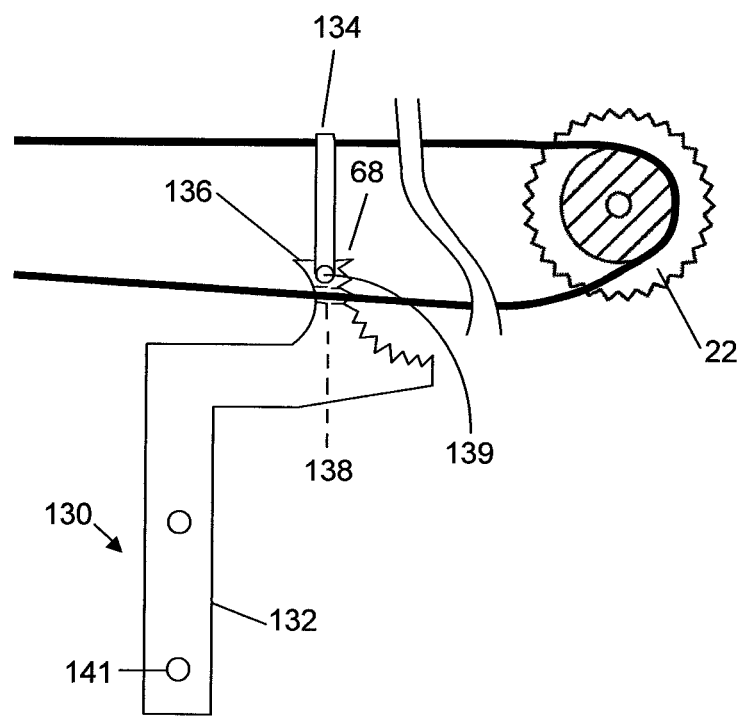
FIG. 7 is a front view of a second object mount of a flying decoration in accordance with the present invention.

With reference to FIG. 7, an object mount extension 130 preferably includes an L-bracket 132 and an optional tie wrap 134. A line support 136 extends from a top of the L-bracket 132. A line hole 138 is formed through the line support 136 for insertion of the transport line 14. A line hole 138 is formed through a top of the line support 136 for insertion of the optional tie wrap 134. The tie wrap 134 is retained on the transport line 14 by attaching the tie wrap 134 to itself. At least one object hole 141 is formed through L-bracket 132 to retain an object.

In use, the drive unit 10 is retained above the ground by a first elevated object, such as the first tree 100. The idler pulley device 16 is retained above the ground by a second elevated object, such as the second tree 102. Each end of the transport line 14 is retained by the first line mount 70 and the line tensioning device 72. The twist handle 94 is rotated to reduce slack in the transport loop 15 to no more than dimension "A" from a top of the transport loop 14. Dimension "A" preferably has a value of 24 inches. Once the flying decoration 1 is installed, the distance for the travel of the object 104 is determined by automatic calibration.

A first calibration claw 140 is formed in a concave outside surface of the first line support 74. A second calibration claw 142 is formed in a concave outside surface of the second line support 76. Each calibration claw 140, 142 includes a plurality of teeth 145. When the calibration claws 140, 142 engage the plurality of teeth 29, 49 on the pulleys 22, 42, rotation of the motor 30 is stopped. At power up, the object mount 12 will move to the idler pulley device 16 and push up against the idler pulley 22. The calibration software program 48 will sense that rotation of the motor 30 has stopped and will stop the motor 30 and reset the number of pulses traveled to zero. The motor 30 will start within a few seconds and the object mount 12 will move in the opposite direction to the drive unit 10. Once again, the object mount 12 will reach the drive unit 10 and push up against the drive pulley 42, causing the motor 30 to stop rotating and the calibration software program 48 will stop the motor 30. While the object mount 12 was moving from the idler pulley 22 to the drive pulley 42, the calibration software program 48 was counting pulses for the amount of distance traveled between the drive pulley 42 and idler pulley 22 and then storing the counted pulses number in memory. The number of pulses will be used to determine the distance of travel for operation.

The calibration software program 48 will then establish a new starting position for the object mount 12 relative to the drive unit 10. The system controller 32 causes the drive shaft 40 to alternate between a clockwise rotation and a counter clockwise rotation to cause the object 104 on the transport line to have a back and forth movement. The calibration software program 48 also monitors the voltage of a power supply 47 connected to the electronic control device 46. The calibration software program 48 adjusts a pulse width modulation (PWM) duty cycle to the motor 30 through the motor controller 50 to maintain a constant speed of the transport line 14.

Figure 12A:
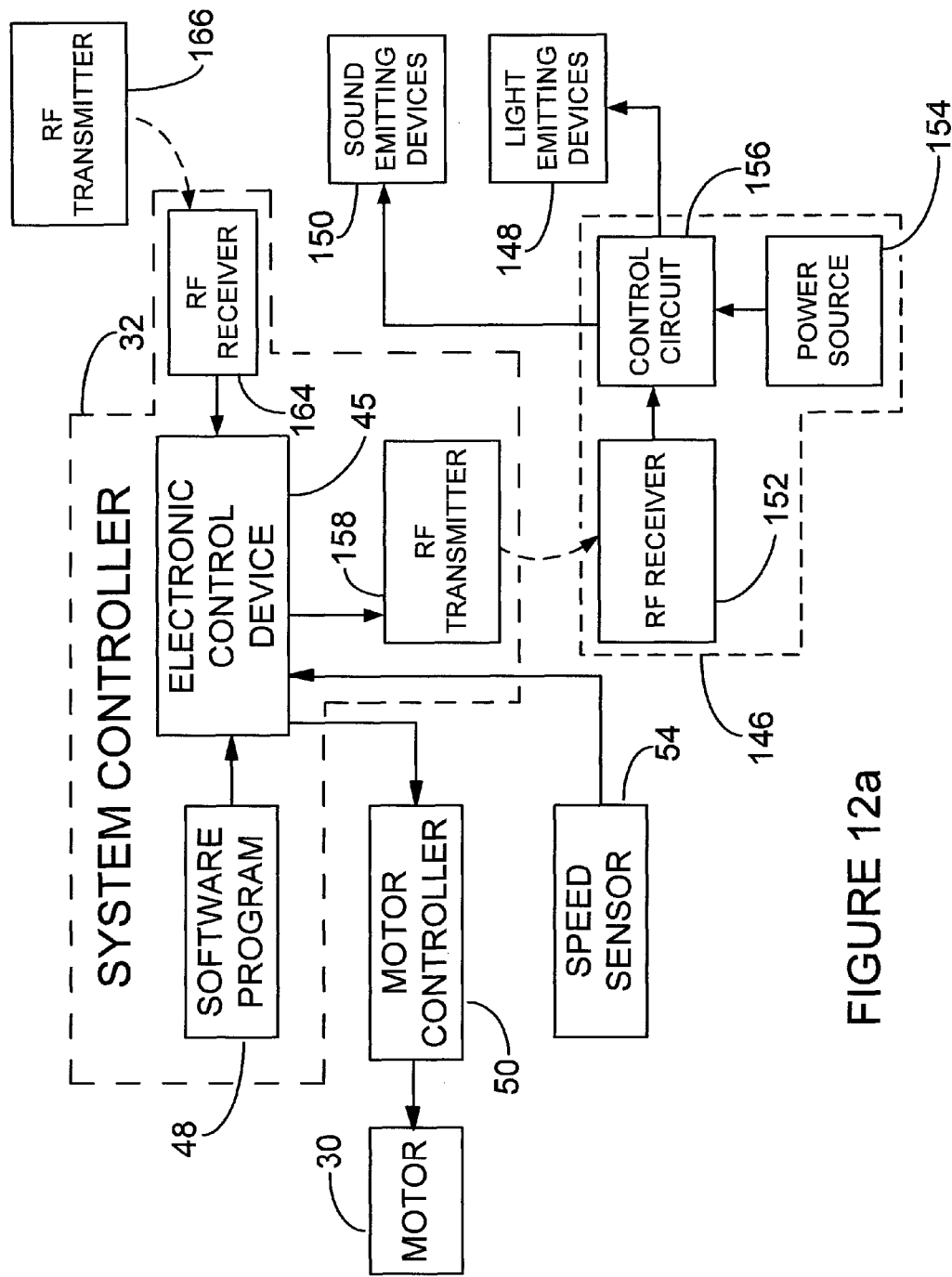
FIG. 12a is a schematic diagram of electrical and electronic components of a flying decoration incorporating wireless control in accordance with the present invention.

With reference to FIG. 12a, at least one power module 146 is used to provide power for at least one light emitting device 148 and at least one sound emitting device 150. The power module 146 includes a radio frequency (RF) receiver 152, a power source 154 and a control circuit 156. The power source 154 can be a battery or come from an electrical outlet. The control circuit 156 receives signals from the RF receiver 152 and is connected to the power source 154. An electrical output of the control circuit 156 is used to power the at least one light emitting device 148 and the at least one sound emitting device 150. An RF transmitter 158 is connected to the system controller 32. The system control 32 wirelessly controls the operation of the at least one light emitting device 148 and the at least one sound emitting device 150 through the RF transmitter 158 and the RF receiver 152. It is preferable that communication between the RF transmitter 158 and the RF receiver 152 be done through encryption. It is preferable that the system controller 32 be operated wirelessly. A system RF receiver 164 is connected to the system controller 32. A system RF transmitter 166 is used to control the operation of the system controller 32 through the system RF receiver 164. Transmitters and receivers are well known in the art and need not be explained in detail.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A flying decoration comprising:
    a drive unit includes a drive motor, a drive pulley and a system controller, said drive pulley is secured to a drive shaft of said drive motor, said system controller controls a speed and rotational direction of said drive pulley, said system controller alternates the rotation of said drive shaft between a clockwise rotation and a counterclockwise rotation, a plurality of holes are formed through said drive pulley;
    an idler pulley device includes an idler pulley;
    an object mount includes means for retaining an object and means for stopping rotation of said drive motor at each end of said object mount;
    a speed sensor for counting said plurality of holes during rotation of said drive pulley; and
    a transport line having a first end and a second end, said first and second ends of said transport line are secured to said object mount to form a transport loop, said drive pulley is engaged with a first end of the transport loop and said idler pulley is engaged with a second end of the transport loop, wherein said drive unit and said idler pulley device are retained above the ground, operation of said drive unit causes said object mount to have a substantially linear back and forth movement.

2. The flying decoration of claim 1, further comprising:
said object mount includes a line mount and a line tensioning device, said line mount is retained on substantially one end of said object mount, said line tensioning device is retained on the substantially the other end of said object mount.

3. The flying decoration of claim 2, further comprising:
said line tensioning device includes a gear drive and a ratchet housing, said ratchet housing is formed in a top of said object mount, said gear drive is rotatably retained in said ratchet housing.

4. The flying decoration of claim 1, further comprising:
a motor controller is electrically connected to said drive motor, said system controller is electrically connected to said motor controller.

5. The flying decoration of claim 1 wherein:
a reflective disk is attached to said drive shaft, a plurality of holes are formed through a reflective disk for sensing by said speed sensor.

6. The flying decoration of claim 1, further comprising:
an object mount extension includes an L-bracket, a line support and a tie wrap, said line support extends from a top of said L-bracket, one end of said transport line is inserted through said line support, said tie wrap is looped around a top of said transport loop, said tie wrap is secured to said itself.

7. The flying decoration of claim 1 wherein:
a system RF receiver is connected to said system controller, a system RF transmitter sends wireless commands to said system controller through said system RF receiver.

8. The flying decoration of claim 1 wherein:
at least one power module includes a RF receiver, a power source and a control circuit, said control circuit receives signals from said RF receiver, said control circuit is connected to said power source, said control circuit powers at least one of a light emitting device and a sound emitting device; and
an RF transmitter is connected to said system controller, said system controller controls the operation of said at least one power module through said RF transmitter and said RF receiver.

9. The flying decoration of claim 1 wherein:
said means for stopping rotation is a calibration claw, said calibration claw includes a plurality of teeth.

10. The flying decoration of claim 1 wherein:
said drive pulley includes one of an inwardly angled groove and an inwardly curving groove, a portion of said groove is hidden from view.

11. The flying decoration of claim 4 wherein:
said system controller monitors power supply voltage, said system controller instructs said motor controller to adjust a PWM cycle to said motor to maintain constant speed.

12. A flying decoration comprising:
a drive unit includes a drive motor, a drive pulley and a system controller, said drive pulley is secured to a drive shaft of said drive motor, said system controller controls a speed and rotational direction of said drive pulley, said system controller alternates the rotation of said drive shaft between a clockwise rotation and a counterclockwise rotation, a plurality of holes are formed through said drive pulley;
an idler pulley device includes an idler pulley;
an object mount includes means for retaining an object and means for stopping rotation of said drive motor at each end of said object mount;
a speed sensor for counting said plurality of holes during rotation of said drive pulley, wherein when one end of said object mount comes near said drive pulley, said means for stopping rotation stops said motor, said speed sensor counts a number of holes of said plurality of holes, until said motor stops again at said idler pulley; and
a transport line having a first end and a second end, said first and second ends of said transport line is secured to said object mount to form a transport loop, said drive pulley is engaged with a first end of the transport loop and said idler pulley is engaged with a second end of the transport loop, wherein said system controller changes direction based on said number of holes.

13. The flying decoration of claim 12, further comprising:
said object mount includes a line mount and a line tensioning device, said line mount is retained on substantially one end of said object mount, said line tensioning device is retained on the substantially the other end of said object mount.

14. The flying decoration of claim 13, further comprising:
said line tensioning device includes a gear drive and a ratchet housing, said ratchet housing is formed in a top of said object mount, said gear drive is rotatably retained in said ratchet housing.

15. The flying decoration of claim 12, further comprising:
a motor controller is electrically connected to said drive motor, said system controller is electrically connected to said motor controller.

16. The flying decoration of claim 12 wherein:
a reflective disk is attached to said drive shaft, a plurality of holes are formed through a reflective disk for sensing by said speed sensor.

17. The flying decoration of claim 12, further comprising:
an object mount extension includes an L-bracket, a line support and a tie wrap, said line support extends from a top of said L-bracket, one end of said transport line is inserted through said line support, said tie wrap is looped around a top of said transport loop, said tie wrap is secured to said itself.

18. The flying decoration of claim 12 wherein:
a plurality of drainage holes are formed through at least one of a front of said drive pulley, said plurality of drainage holes are formed adjacent said transport line.

19. A flying decoration comprising:
a drive unit includes a drive motor, a drive pulley and a system controller, said drive pulley is secured to a drive shaft of said drive motor, said system controller controls a speed and rotational direction of said drive pulley, said system controller alternates the rotation of said drive shaft between a clockwise rotation and a counterclockwise rotation, a plurality of holes are formed through said drive pulley;
an idler pulley device includes an idler pulley;
an object mount includes a line tensioning device, means for retaining an object and means for stopping rotation of said drive motor at each end of said object mount;
a speed sensor for counting said plurality of holes during rotation of said drive pulley; and a transport line having a first end and a second end, said first and second ends of said transport line is secured to said object mount to form a transport loop, said line tensioning device includes a ratchet mechanism for reducing slack in said transport loop, said drive pulley is engaged with a first end of the transport loop and said idler pulley is engaged with a second end of the transport loop, wherein said drive unit and said idler pulley device are retained above the ground, operation of said drive unit causes said object mount to have a substantially linear back and forth movement.

20. The flying decoration of claim 19, further comprising:
said object mount includes a line mount and said line tensioning device, said line mount is retained on substantially one end of said object mount, said line tensioning device is retained on the substantially the other end of said object mount.

* * * * *